US007161111B2

(12) United States Patent
Schneider

(10) Patent No.: US 7,161,111 B2
(45) Date of Patent: Jan. 9, 2007

(54) PLASMA TORCH HAVING A QUICK-CONNECT RETAINING CUP

(75) Inventor: Joseph C. Schneider, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 16 days.

(21) Appl. No.: 10/711,029

(22) Filed: Aug. 18, 2004

(65) Prior Publication Data

US 2006/0037945 A1 Feb. 23, 2006

(51) Int. Cl.
*B23K 10/00* (2006.01)

(52) U.S. Cl. ............................ 219/121.4; 219/121.48; 219/121.51; 219/121.39

(58) Field of Classification Search ........... 219/121.48, 219/121.39, 121.5, 121.51, 121.52, 74, 75
See application file for complete search history.

(56) References Cited

U.S. PATENT DOCUMENTS 6,881,921 B1 * 4/2005 Horner-Richardson et al. ...................... 219/121.48
2001/0025833 A1 * 10/2001 Kelkar et al. ............ 219/121.5
2004/0200809 A1 * 10/2004 MacKenzie et al. ... 219/121.49
2005/0000948 A1 * 1/2005 Brasseur et al. ......... 219/121.5
2005/0109736 A1 * 5/2005 Matus ..................... 219/121.5

* cited by examiner

*Primary Examiner*—Mark Paschall
(74) *Attorney, Agent, or Firm*—Ziolkowski Patent Solutions Group, SC

(57) ABSTRACT

A plasma torch assembly having a quick-connect retaining cup is disclosed. The plasma torch has a torch body constructed to receive an electrode therein. A retaining cup secures the electrode to the torch body by rotating the retaining cup less than approximately 360 degrees relative to the torch body.

29 Claims, 3 Drawing Sheets

PLASMA TORCH HAVING A QUICK-CONNECT RETAINING CUP

BACKGROUND OF INVENTION

The present invention relates generally to plasma cutting systems and other high power output welding-type systems such as welding and induction heating systems and, more particularly, to a quick-connect retaining cup for use with such systems.

Plasma cutting is a process in which an electric arc is used for cutting a workpiece. Plasma cutters typically include a power source, an air supply, and a torch. The torch, or plasma torch, is used to create and maintain the plasma arc that performs the cutting. A plasma cutting power source receives an input voltage from a transmission power line or generator and provides output power to a pair of output terminals, one of which is connected to an electrode and the other of which is connected to the workpiece.

An air supply is used with most plasma cutters to help start the arc, provide the plasma gas to the torch, and cool the torch. A movable or fixed electrode or consumable serves as a cathode and a fixed or moveable nozzle or tip serves an anode. In some units, the air supply is used to force a separation of the electrode and tip to create an arc. The arc initiates a plasma jet that is forced out through the opening in the nozzle by the compressed air. The plasma jet causes the arc to transfer to the workpiece, and thus initiates the cutting process. In other plasma cutting systems, a high frequency starter can be used to initiate the arc, and still others can employ high voltage to initiate the arc. In either arrangement, the spaced relationship or the range of movement of the cathodic component and the anodic component are considerations to be addressed for the generation of a pilot arc and maintaining of a cutting arc.

During the generation of the pilot arc and the cutting process, the proper alignment and positioning of the components of the torch affect arc generation and proper torch operation. Improper alignment of the components of the torch can result in premature wear of the components or, if unaddressed, can result in inoperability of the torch. Additionally, as the arc transfers from the electrode to the workpiece in the plasma, substantial heat is generated. The level of heat generated is partially determined by the type of material being worked, the power output required to work the material, and the type of consumable required to effectuate the desired work. Due to the high operating temperatures, the remaining working life of certain components, called consumables, is reduced during cutting. Improper consumable alignment can result in the components of the consumable assembly being subjected to elevated temperatures during torch operation. Cutting with an overheated or overused consumable can result in poor cut quality or reduced cutting speeds. As such, operating life of the components of the consumable assembly is partly dependent on operating conditions and, if unaddressed, may require replacement of the consumable assembly in the middle of a cutting job.

Known plasma torches generally have a cup or cap that threadingly connects to the torch. The cup secures the consumable components, such as the tip and electrode, to the torch and determines the relative position of the components to the torch. After extended periods of operation, the electrode, cup, and other consumables can become worn. A worn consumable electrode should be replaced to maintain cut integrity and desirable cutting speeds. Replacing these consumables requires an operator to remove and replace the electrode and cap assembly. Replacing threaded components consumes time from the cutting process and reduces efficiency. Also, overtightening or cross-threading of the cap during replacement of the tip and electrode can result in improper alignment of the components within the torch. Such misalignments can detract from cut quality, increase component wear, and can ultimately result in torch inoperability—requiring total replacement.

It would, therefore, be desirable to design a cup that can be quickly and repeatably connected to a plasma torch.

BRIEF DESCRIPTION OF INVENTION

The present invention provides a plasma torch assembly that solves the aforementioned problems by providing a plasma torch assembly that includes a quick-connect retaining cup that is quickly and repeatably connectable to a plasma torch. The quick-connect retaining cup orients the consumable components to the plasma torch and assures proper alignment of the components therewith.

Therefore, in accordance with one aspect of the present invention, a plasma torch assembly is disclosed that includes a torch body having a handle portion and a tip portion. An electrode is disposed in the tip portion of the torch body. The assembly also includes a retaining cup constructed to encircle the electrode in the torch body and connect to the tip portion with less than approximately 180 degrees rotation relative to the torch body.

In accordance with another aspect of the present invention, a plasma cutter is disclosed that includes a power source configured to condition power into a form usable by a plasma cutting process. The plasma cutter also includes a torch connected to the power source and configured to effectuate the plasma cutting process. An electrode is disposed in the torch, and a cup having a twist-lock quick-connect mechanism removably connects the cup to the torch and is constructed to maintain an operable position of the electrode and prevent overtightening of the cup to the torch.

In accordance with an alternate aspect of the present invention, a plasma torch assembly is disclosed that includes a torch body, an electrode, and a means for connecting the electrode to the torch body. The connecting means having a fully engaged position with less than one complete rotation of the means from an unlock position to a lock position.

In accordance with yet another aspect of the present invention, a plasma torch consumable is disclosed that includes a quick connect cup having a partial-turn engagement mechanism engageable with another engagement mechanism of a plasma torch.

Various other features, objects, and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
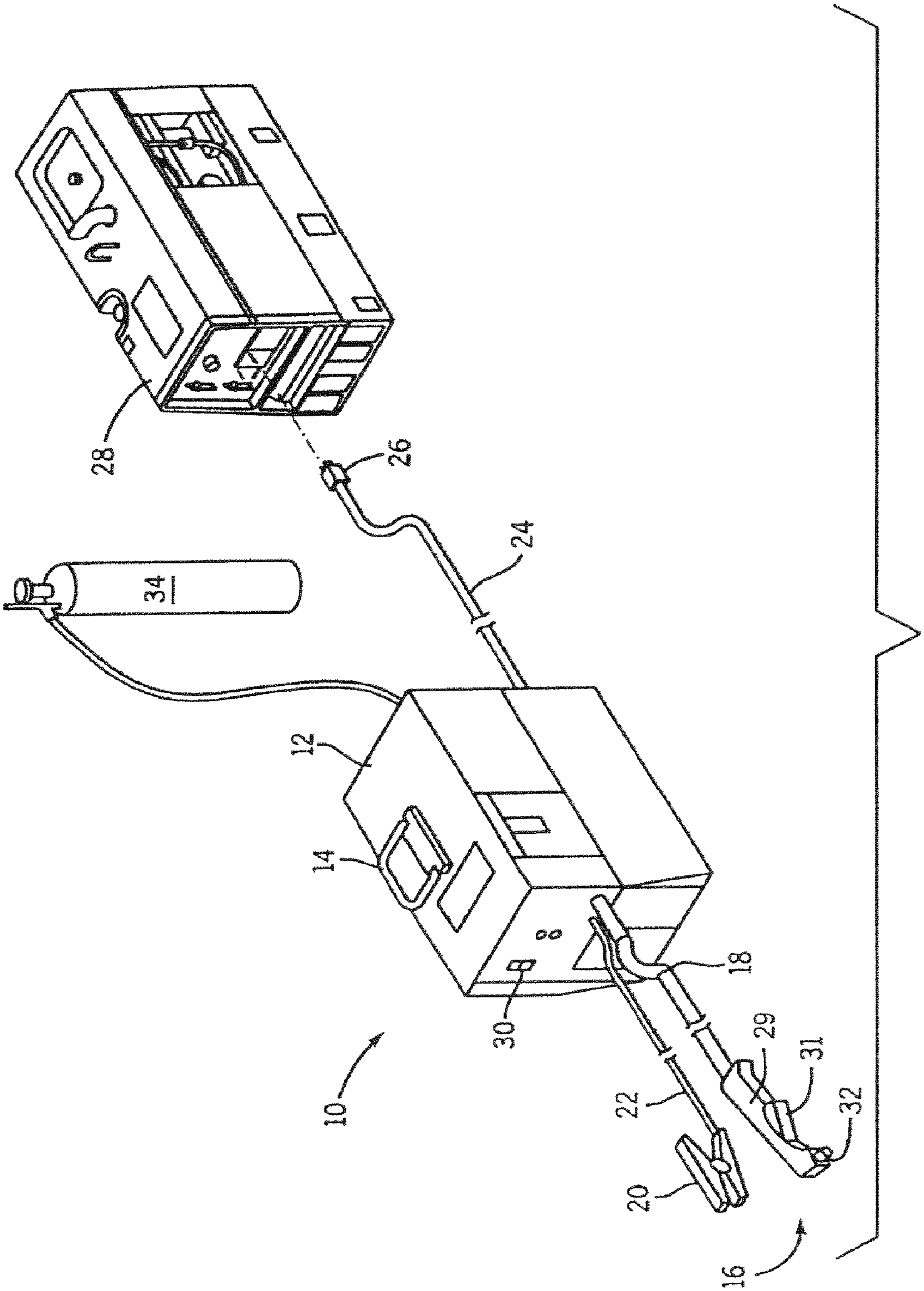
FIG. 1 is a perspective view of a plasma cutting system incorporating the present invention.

FIG. 1 shows a plasma cutting system 10 according to the present invention. The plasma cutting system is a high voltage system with open circuit output voltages ranging from approximately 230 Volts Direct Current (VDC) to over 300 VDC. The plasma cutting system 10 includes a power source 12 to condition raw power and regulate/control the cutting process. Specifically, the power source 12 includes a processor that receives operational feedback and controls the plasma cutting system 10 accordingly. Power source 12 includes a lifting means 14, such as a handle, which effectuates transportation from one site to another. Connected to the power source 12 is a torch 16 via cable 18. The cable 18 provides the torch 16 with power and compressed air, and also serves as a communications link between the torch 16 and power source 12. Torch 16 includes a handle portion, or torch body 29 having a trigger 31 thereon and work tip 32 extending therefrom.

Also connected to power source 12 is a work clamp 20 which is designed to connect to a workpiece (not shown) to be cut and provides a grounding path. Connecting work clamp 20 to the power source 12 is a cable 22 designed to provide a return path, or grounding path, for the cutting current from the torch through the workpiece and the work clamp 20. Extending from a rear portion of power source 12 is a power cable 24 having a plug 26 for connecting the power source 12 to either a portable power supply 28 or a transmission line power receptacle (not shown). Power source 12 includes an ON/OFF switch 30 and may also include amperage and air pressure regulation controls, indicator lights, and a pressure gauge.

To effectuate cutting, torch 16 is placed in close proximity to a workpiece connected to clamp 20. A user may then activate trigger 31 on torch 16 to deliver compressed air and power to work tip 32 of torch 16 to initiate a pilot arc and plasma jet. Shortly thereafter, a cutting arc is generated as the user moves the torch to the workpiece. The arc transfers from the electrode to the workpiece through the tip. The user may then cut the workpiece by moving the torch thereacross. The user may adjust the speed of the cut to reduce spark splatter and provide a more-penetrating cut by adjusting amperage and/or air pressure. Gas is supplied to torch 16 from a pressurized gas source 34, from an internal air compressor, or an external air compressor.

Figure 2:
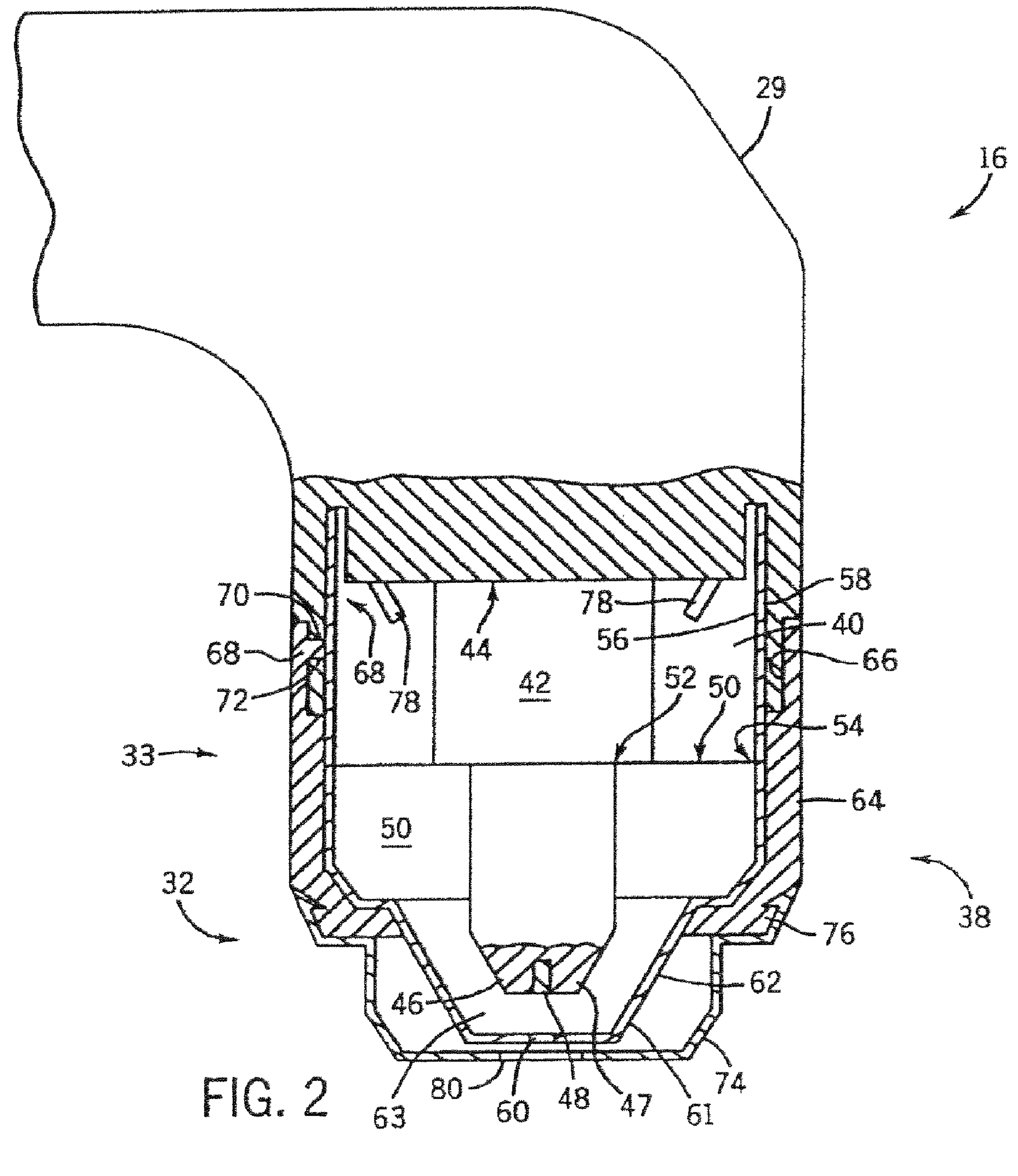
FIG. 2 is a partial cross-sectional view of the torch assembly shown in FIG. 1.

Referring now to FIG. 2, a head portion 33 of the plasma cutting torch 16 is shown in partial cross-section. Plasma torch 16 is defined by torch body 29 that is connected to head portion 33 of torch 16. A consumable assembly 38 is positioned in head portion 33 and is quick-connectable to torch body 29 by a cup 64. Consumable assembly 38 is connected to head portion 33 so as to define a gas chamber 40 that, as will be described in greater detail below, allows for the charging of the gas into a plasma and passage of the gas therefrom. Centrally disposed within gas chamber 40 is an electrode 42. Electrode 42 has a base 44 that electronically communicates with power source 12 through torch body 36. Electrode 42 includes an electrode tip 46 at an opposite end 47 from the base 44 of the electrode 42. Electrode tip 46 has an insert 48 formed therein that exhibits certain preferred electrical, thermal, and chemical properties. Insert 48 is preferably formed of hafnium or zirconium, the importance of which is well known in the art.

Electrode 42 has a swirl ring 50 positioned thereabout. Optionally, electrode 42 may be press-fit into an opening 52 formed generally in the center of swirl ring 50. An outer diameter 54 of swirl ring 50 engages an inner surface 56 of a tip 58. Tip 58 generally encircles electrode 42 and swirl ring 50 and includes an orifice 60 at an end 61 thereof. Orifice 60 is positioned generally adjacent to insert 48 of electrode 42 and is constructed to allow the passage of an electrical arc therethrough. Tip 58 also has a nozzle portion 62 formed about orifice 60 and end 47 of electrode 42. Nozzle portion 62 is constructed to direct the plasma flow from a plasma chamber 63 into a concentrated, highly charged, plasma flow. Plasma chamber 63 is formed in the space between electrode 42 and nozzle portion 62 of tip 58. During a cutting process, the pilot arc is generally formed in plasma chamber 63 between electrode 42 and tip 58 to cause generation of the plasma gas.

A cup 64, or retaining cup/cap, passes over nozzle portion 62 of tip 58 and engages an end 66 of torch body 29. Cup 64 is constructed to snuggly engage tip 58 and quick-connectable to torch body 29. Cup 64 has a torch end 68 with a tab 70 formed thereat. Tab 70 of cup 64 engages a channel 72 formed in end 66 of torch body 29 and allows consumable assembly 38 to be quickly connected and disconnected from torch body 29. Such a construction quickly orients the components of consumable assembly 38 with torch body 29 for repeatable alignment of the components of consumable assembly 38 with torch body 29 and thereby proper torch operation. Additionally, it is understood that swirl ring 50 is not necessary for certain plasma cutting processes and/or that the swirl ring is sometimes integrally connected to the torch body 29.

A shield 74 is connected to cup 64 about an end 76 thereof and is constructed to maintain an appropriate arc distance between insert 48 of electrode 42 and a workpiece. In operation, gas is injected into chamber 40 via a plurality of passages 78. The gas passes through swirl ring 50 and into plasma chamber 63 where it is heated to a plasma state. The plasma is then forced out of plasma chamber 63, through nozzle portion 62, and out tip 58 via orifice 60. The plasma exits consumable assembly 38 at an opening 80 in shield 74. Nozzle portion 62 is designed to focus the velocity as well as the heat of an arc that is created between a workpiece (not shown) and insert 48 of electrode 42. A cutting arc swirls about insert 48 and travels to a workpiece in the plasma flow through torch 16. Insert 48 is constructed to be conductive and to resist deterioration associated with the high temperature arc which swirls thereabout. Proper alignment of the components of the consumable assembly with torch 16 ensures proper pilot arc generation, cutting arc operation, and consumable component operational longevity.

Figure 3:
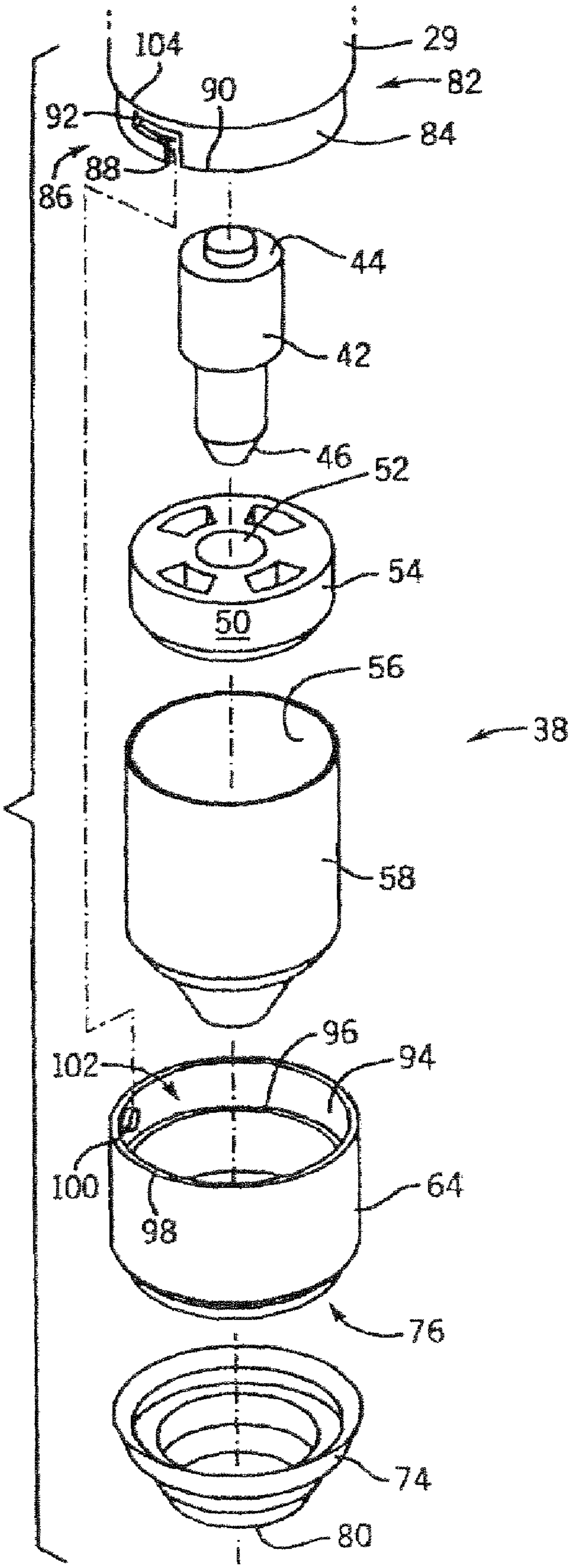
FIG. 3 is an exploded perspective view of the torch assembly shown in FIG. 2.

The components of consumable assembly 38, as shown in FIG. 3, are removably connected to torch body 29. As shown in FIG. 3, torch body 29 has an end 82 with a flange 84 extending thereabout. A channel 86 is formed in an L-shape about a portion of flange 84 and includes a first section 88 extending from an edge 90 of torch body 29 to a second section 92 of channel 86. Second section 92 of channel 86 is oriented generally transverse to first section 88 of channel 86. Shield cup 64 includes an inner surface 94 extending from a shoulder 96 to an edge 98 of shield cup 64. A pin 100 extends from inner surface 94 of cup 64 between shoulder 96 and edge 98. Pin 100 is constructed to engage channel 86 formed in flange 84 of torch body 36 with tip 58, swirl ring 50, and electrode 42 disposed therebetween.

Cup 64 is axially translatable relative to torch body 36 as pin 100 passes through first section 88 of channel 86. Second section 92 of channel 86 allows partial rotation of cup 64 relative to torch body 36 and engages pin 100 therein thereby securing cup 64, tip 58, swirl ring 50, and electrode 42 within the space between cup 64 and torch body 36. As shown, approximately 45 degrees of rotation of cup 64 relative to torch body 36 secures the components of consumable assembly 38 to torch body 29. Cup 64 is rotatable from an unlocked position, wherein pin 100 engages first section 88 of channel 86, to a locked position as pin 100 passes along second section 92 of groove 86 thereby forming a twist-lock quick-connect mechanism. Such a construction forms a consumable assembly that is quickly and easily associated with torch body 29. Accordingly, plasma torch 16 is constructed to provide complete engagement between cup 64 and torch body 29 within a single-grip rotation of cup 64 relative to torch 16. As such, an operator need only grip cup 64 once and fully engage cup 64 with torch 16 within a typical wrist rotation.

During assembly, electrode tip 46 passes through opening 52 formed in swirl ring 50. Electrode 42 and swirl ring 50 are disposed within the inner surface 56 of tip 58 which is disposable within opening 102 of cup 64. When connected to torch body 36, shoulder 96 of cup 64 abuts edge 90 of torch body 29 and edge 98 of cup 64 abuts a shoulder 104 formed about end 82 of torch body 29. During certain cutting operations shield 74 can be connected about end 76 of cup 64 to prevent contact of tip 58 with a workpiece. As shown, cup 64 rotates approximately 45 degrees relative to torch body 36 to fully engage the consumable assembly therewith. Although shown as having approximately 45 degrees of relative rotation to torch body 29, it is understood that other degrees of rotation and orientations other than pin 100 and channel 86 are within the scope of the claims. Additionally, it is equally understood to form a quick-connect consumable assembly wherein the cup and torch are connectable with twist-lock mechanisms other than those shown, such as a DINSE-style partial-turn engagement mechanism.

The heretofore description of a welding apparatus, or plasma cutter, illustrates just one embodiment in which the present invention may be implemented. The present invention is equivalently applicable with many high power systems, such as cutting and induction heating systems or any similar systems.

Therefore, the present invention includes a plasma torch assembly including a torch body having a handle portion and a tip portion. An electrode is disposed in the tip portion of the torch body. The assembly also includes a retaining cup constructed to encircle the electrode in the torch body and connect to the tip portion with less than approximately 180 degrees rotation relative to the torch body.

In another embodiment of the present invention, a plasma cutter includes a power source configured to condition power into a form usable by a plasma cutting process. The plasma cutter also includes a torch connected to the power source and configured to effectuate the plasma cutting process. An electrode is disposed in the torch, and a cup having a twist-lock quick-connect mechanism removably connects the cup to the torch and is constructed to maintain an operable position of the electrode and prevent overtightening of the cup to the torch.

An alternate embodiment of the present invention has a plasma torch assembly that includes a torch body, an electrode, and a means for connecting the electrode to the torch body. The connecting means has a fully engaged position with less than one complete rotation of the means from an unlock position to a lock position.

In yet another embodiment of the present invention, a plasma torch consumable is disclosed that includes a quick connect cup having a partial-turn engagement mechanism engageable with another engagement mechanism of a plasma torch.

The present invention has been described in terms of the preferred embodiment, and it is recognized that equivalents, alternatives, and modifications, aside from those expressly stated, are possible and within the scope of the appending claims.

What is claimed is:

1. A plasma torch assembly comprising:

a torch body having a handle portion and a tip portion;

an electrode disposed in the tip portion of the torch body; and a retaining cup constructed to encircle the electrode in the torch body and connect to the tip portion with less than approximately 180 degrees rotation relative to the torch body.

2. The plasma torch assembly of claim 1 further comprising an L-shaped groove formed in at least one of the retaining cup and the tip portion of the torch body.

3. The plasma torch assembly of claim 2 further comprising a pin extending from at least one of the retaining cup and the tip portion of the torch body and constructed to engage the groove.

4. The plasma torch assembly of claim 1 further comprising a shield connectable to the retaining cup generally opposite the tip portion of the torch body.

5. The plasma torch assembly of claim 4 wherein the shield is at least one of a drag shield and a gouging shield.

6. The plasma torch assembly of claim 1 further comprising a swirl ring disposed generally between the electrode and the tip portion of the torch body.

7. The plasma torch assembly of claim 1 wherein the retaining cup is fully connectable to the tip portion of the torch body by approximately 90 degrees of rotation therebetween.

8. The plasma torch assembly of claim 1 wherein the plasma torch assembly is any one of a contact start plasma torch, a high-frequency start plasma torch assembly, and a high voltage start plasma torch assembly.

9. The plasma torch assembly of claim 1 further comprising a cable having a first end connected to the plasma torch assembly and a second end connectable to a power source.

10. A plasma cutter comprising:

a power source configured to condition power into a form usable by a plasma cutting process;

a torch connected to the power source and configured to effectuate the plasma cutting process;

an electrode disposed in the torch; and a cup having a twist-lock quick-connect mechanism removably connecting the cup to the torch and constructed to maintain an operable position of the electrode and prevent overtightening of the cup to the torch.

11. The plasma cutter of claim 10 further comprising a pin and channel engagement between the cup and torch constructed to limit rotation therebetween to less than approximately 360 degrees.

12. The plasma cutter of claim 10 further comprising a swirl-ring disposed between the electrode and the torch and constructed to direct a flow of gas therethrough.

13. The plasma cutter of claim 10 further comprising a shield connected to the cup.

14. The plasma cutter of claim 10 wherein the twist-lock mechanism is constructed to provide complete engagement within a single-grip rotation.

15. The plasma cutter of claim 10 further comprising a pin extending from one of the cup and the torch and constructed to engage a groove formed in another of the cup and the torch.

16. The plasma cutter of claim 10 wherein the torch is one of a contact start torch, a high-frequency start torch, and a high-voltage start torch.

17. A plasma torch assembly comprising:

a torch body;

an electrode;

means for connecting the electrode to the torch body having a fully engaged position with less than one complete rotation of the means from an unlock position to a lock position.

18. The plasma torch assembly of claim 17 wherein the fully engaged position of the connecting means is approximately 90 radial degrees from the initial position.

19. The plasma torch assembly of claim 17 wherein at least one of the torch body and the connecting means includes a groove constructed to engage a pin on another of the torch body and the connecting means.

20. The plasma torch assembly of claim 19 wherein the pin and groove cooperate to prevent overtightening of the connecting means to the torch body.

21. The plasma torch assembly of claim 17 further comprising a cable connecting the plasma torch assembly to a power source configured to generate a power signal applicable to a plasma process.

22. A plasma torch consumable comprising a quick connect cup having a partial-turn engagement mechanism engageable with another engagement mechanism of a plasma torch.

23. The plasma torch consumable of claim 22 wherein the partial-turn engagement mechanism of the quick connect cup is a twist-lock mechanism.

24. The plasma torch consumable of claim 23 wherein the twist-lock mechanism is one of a DINSE-style connector and includes a pin and groove engagement.

25. The plasma torch consumable of claim 23 wherein the twist-lock mechanism prevents overtightening of the quick connect cup to the torch.

26. The plasma torch consumable of claim 22 wherein the partial turn engagement mechanism is defined to have a rotation less than 360 degrees when moved from a disengaged position to an engaged position.

27. The plasma torch consumable of claim 22 wherein the partial turn engagement mechanism is a half-turn engagement mechanism wherein rotation of the quick connect cup relative to the plasma torch fully connects the quick connect cup thereto.

28. The plasma torch consumable of claim 22 wherein the partial-turn engagement mechanism includes one of a groove and a pin and another engagement mechanism is another one of a groove and pin.

29. The plasma torch consumable of claim 22 wherein the partial-turn engagement mechanism includes a thread on each of the quick connect cup and the torch having a stop mechanism preventing rotation past a partial turn of the cup with respect to the torch.

* * * * *